United States Patent
Cook et al.

(10) Patent No.: US 11,043,687 B2
(45) Date of Patent: Jun. 22, 2021

(54) METHOD OF MAKING COMPONENTS FOR AN ELECTROCHEMICAL CELL AND AN ELECTROCHEMICAL CELL AND CELL STACK

(71) Applicant: Dana Limited, Maumee, OH (US)

(72) Inventors: Christopher M. Cook, McKenzie, TN (US); Keith C. Henegar, Springville, TN (US); Jack A. Kummerow, Big Sandy, TN (US); Kelly D. Puckett, Paris, TN (US); Eve S. Steigerwalt, Nashville, TN (US)

(73) Assignee: Dana Limited, Maumee, OH (US)

( * ) Notice: Subject to any disclaimer, the term of this patent is extended or adjusted under 35 U.S.C. 154(b) by 229 days.

(21) Appl. No.: 15/950,462

(22) Filed: Apr. 11, 2018

(65) Prior Publication Data

US 2019/0319291 A1  Oct. 17, 2019

(51) Int. Cl.
| | | |
|---|---|---|
| *H01M 8/2404* | (2016.01) | |
| *B33Y 10/00* | (2015.01) | |
| *B33Y 80/00* | (2015.01) | |
| *B33Y 70/00* | (2020.01) | |
| *B29C 64/118* | (2017.01) | |
| *H01M 8/0226* | (2016.01) | |
| *H01M 8/0213* | (2016.01) | |
| *H01M 8/0263* | (2016.01) | |
| *H01M 8/1069* | (2016.01) | |
| *B29K 101/12* | (2006.01) | |
| *B29L 31/34* | (2006.01) | |

(52) U.S. Cl.
CPC ......... *H01M 8/2404* (2016.02); *B29C 64/118* (2017.08); *B33Y 10/00* (2014.12); *B33Y 70/00* (2014.12); *B33Y 80/00* (2014.12); *H01M 8/0213* (2013.01); *H01M 8/0226* (2013.01); *H01M 8/0263* (2013.01); *H01M 8/1069* (2013.01); *B29K 2101/12* (2013.01); *B29K 2995/0005* (2013.01); *B29L 2031/3468* (2013.01)

(58) Field of Classification Search
None
See application file for complete search history.

(56) References Cited

U.S. PATENT DOCUMENTS

| | | | | |
|---|---|---|---|---|
| 6,096,450 | A * | 8/2000 | Walsh ................ | H01M 8/0206 29/623.5 |
| 6,099,984 | A * | 8/2000 | Rock .................. | H01M 8/0263 429/492 |
| 6,399,233 | B1 | 6/2002 | Milliken et al. | |
| 6,416,899 | B1 * | 7/2002 | Wariishi ............. | H01M 8/2483 429/446 |
| 2003/0235738 | A1 * | 12/2003 | Zheng ................ | H01M 8/2405 429/457 |
| 2005/0242471 | A1 | 11/2005 | Bhatt et al. | |
| 2009/0274935 | A1 * | 11/2009 | Kikuchi .............. | H01M 8/0247 429/430 |
| 2010/0159362 | A1 | 6/2010 | Ito et al. | |
| 2013/0074716 | A1 | 3/2013 | Ito et al. | |
| 2016/0093898 | A1 | 3/2016 | Gould et al. | |
| 2016/0240867 | A1 | 8/2016 | Chini et al. | |
| 2016/0329586 | A1 | 11/2016 | Ninan et al. | |
| 2017/0309928 | A1 * | 10/2017 | Lee .................... | H01M 8/04156 |

\* cited by examiner

*Primary Examiner* — Jonathan Crepeau
(74) *Attorney, Agent, or Firm* — McCoy Russell LLP (57) ABSTRACT

A component for an electrochemical cell is formed by additive manufacturing process. The additive manufacturing process can be repeated to produce fuel cell stack.

21 Claims, 7 Drawing Sheets

METHOD OF MAKING COMPONENTS FOR AN ELECTROCHEMICAL CELL AND AN ELECTROCHEMICAL CELL AND CELL STACK

FIELD

The device and method relates to producing one or more electrochemical cells, components of the cell, and/or through additive manufacturing or 3D printing technology. The components may comprise one or more separator plates, which together may form a bipolar plate assembly, and/or a membrane electrode assembly (MEA), or any of the MEAs components. The method can include the use of a doped, impregnated or coated polymer to provide electrical conductive properties to the components, and application of electromagnetic or other energy sources to induce welding for producing a more robust and electrically isotropic structure along three dimensions.

BACKGROUND

Electrochemical cells, such as fuel cells, produce electricity through a chemical reaction. One common reaction in fuel cells consists of a reaction between hydrogen and oxygen to produce water and release an electrical charge. Usually, each cell only produces a small amount of voltage. In order to increase the voltage to do useful work, the cells are connected in series in a fuel cell stack.

Fuel cells typically include at least one MEA, and where there are two MEAs, there is at least one bipolar plate assembly that may separate the two MEAs. The MEA may comprise a plurality of layers, where the number of layers depends on the MEA being constructed. In one embodiment, the MEA can be a 5 layer MEA comprised of a polymer electrolyte membrane sandwiched between an anode catalyst layer and a cathode catalyst layer. The outside surfaces of each catalyst layer are bounded by a gas diffusion layer.

The bipolar plate assembly typically comprises an anode separator plate and a cathode separator plate. The bipolar plate assembly is located between two MEAs. The bipolar plate assembly functions to deliver fuel, such as hydrogen and oxygen to the adjacent MEAs, provides mechanical support to the MEAS, and it also can function to cool the MEAs. The anode separator plate and the cathode separator plates can be joined together to form enclosed cooling channels.

MEAs can be alternated with bipolar plate assemblies to create fuel cell stacks. In some cases, there are many MEAs alternated with many bipolar plate assemblies to create a fuel cell stack so that the stack can generate sufficient electricity to do useful work.

Separator plates are typically made of electrically conductive metal, carbon, or polymeric composites. The separator plates provide electrical conduction from one MEA to the adjacent MEA. As noted above, separator plates can include channels to provide media, such as the reactants of fuel and oxygen, to feed the reaction, and cooling fluid. The MEA and separator plates together may form a cell. The plates provide structural support to the cell.

Separator plates can be machined from a solid block of graphite, which has the advantage of isotropic electrical properties. Such a process, however, can be expensive and time consuming.

Separator plates can also be created by adding material, such as graphite flakes, to polymer in a mold. Disadvantageously, the graphite flakes generally orient only along the x-y plane and not through the layers in the z-direction, so the plate is not electrically isotropic. Metal powders can be added to the material, but this adds weight and makes the plates heavier. The prior art designs may use a polymer with high graphite filler content, which ends up degrading the moldability of the material.

Usually separator plates have been made by stamping or molding processes, with metallic plates typically made by stamping, and polymeric plates typically made by molding. Such processes involve expensive tooling and are limited to producing a single plate design unless expensive retooling is to be incurred. Thus, manufacturers are often limited to making fuel cells of a single shape or size, unless new tooling is created. The standard shape/size often used for fuel cells is square or rectangular, which in some cases doesn't fit well into the space available, such as in a vehicle.

The prior art fuel cells also require many gaskets to seal the various fluid channels. Each one of the gaskets adds cost to the fuel cell and each one of the gaskets represents a failure mode for the fuel cell.

The prior art fuel cells also required bulky and heavy clamping mechanisms for the seals to be effective and to lower the electrical resistance between the MEA components and the separator plates.

Producing bipolar plates, fuel cells and fuel cell stacks using additive manufacturing processes would provide several advantages over the prior art. For example, the geometric shape or design of the MEA components, bipolar plates, fuel cells and/or stack can be altered without retooling. This permits fuel cell components, and thus the fuel cells themselves, to have non-standard shapes. As a result, the fuel cells can be located in non-traditional spaces within the vehicle resulting in more efficient use of the vehicle space.

In addition, the fuel cell components can be printed on to each other to form a fuel cell without requiring gaskets and clamping mechanisms for sealing the fuel cell or stack. This significantly reduces failure modes of the fuel cell, as well as reduces cost, weight and complexity of the fuel cell.

The methods or processes disclosed herein use additive manufacturing to produce fuel cell components, and/or a fuel cell, having substantially the same structural integrity, strength and electrically conductivity in all three dimensions. In addition, methods disclosed herein use additive manufacturing to produce a fuel cell and fuel cell stack. By printing the components of the fuel cell stack in a unitary fashion, gaskets and compression process and equipment can be reduced or eliminated. Furthermore, by using additive manufacturing to produce the fuel cell components, it reduces the need for excessive handling of the components during manufacture and fuel cell stack assembly. In addition, printed components can be significantly lighter and can be customized in terms of size and shape.

SUMMARY

A method of making an electrochemical cell includes printing a component of the electrochemical cell with an additive fabrication apparatus. The method may include providing an additive fabrication apparatus for producing 3D objects from a data file. The additive fabrication apparatus may comprise a support platform having a build area for producing a three-dimensional object on the support platform, a movable deposition device for depositing a flowable, electrically conductive material on the build area, and a computer for controlling the position and deposition of the material. The method may also include heating the conductive material with a heating device to provide the flowable, conductive material to the deposition device. The method may also include obtaining the data file from a computer for defining a three-dimensional shape of a component for an electrochemical cell having at least one channel for transport of media.

It may be a further aspect of the method that the conductive material is a carbon carrying thermoplastic or thermoset material.

It may be a further aspect of the method that the carbon carrying thermoplastic material is a carbon coated thermoplastic filament.

It may be a further aspect of the method that a cross-sectional area of the channel is varied as it is being deposited.

It may be a further aspect of the method to use the apparatus to print a plurality of channels in the component and one or more manifolds in communication with the channels.

It may be a further aspect of the method that an activation step is used to cure the conductive material.

It may be a further aspect of the method that the channel is a meandering channel traversing from one side across a face of the component to an opposite side of the face and along the length of the face of the component.

It may be a further aspect of the method that the component includes a first opening at one end of, and in fluid communication with, the meandering channel, and a second opening at another end of, and in fluid communication with, the meandering channel.

It may be a further aspect of the method that the component is an anode separator plate, a cathode separator plate, or a bipolar plate.

It may be a further aspect of the method that the bipolar plate comprises two active surfaces on opposite sides of the plate, wherein one active surface faces an anode electrode cell and the opposite side faces a cathode electrode cell.

It may be a further aspect of the method that the component is an anode separator plate with an anode separator plate meandering channel printed on one side of the anode separator plate and further comprising, adding an electrically insulating material about the anode separator plate, placing a membrane electrode assembly on the anode separator plate, printing a cathode separator plate with initially flowable deposited material
on the membrane electrode assembly and the electrically insulating material according to the date file, wherein said cathode separator plate is printed with a first cathode plate meandering channel on a first side and a second cathode plate meandering channel on a second side.

It may be a further aspect of the method that energy is applied to one or more of the anode separator plate, the cathode separator plate, the electrically-insulating material or the membrane electrode assembly.

It may be a further aspect of the method that the energy causes the anode separator plate to become flowable so that the membrane electrode assembly becomes embedded in the anode separator plate.

Another aspect for a method of making a fuel cell stack may comprise
providing an additive fabrication apparatus for producing 3D objects, the additive fabrication apparatus including a support platform for supporting fabrication of a three-dimensional object thereon;

heating a conductive material above a first temperature to provide flowable conductive material to the deposition mechanism, the flowable material solidifying below a second temperature;

providing a data file on a computer that defines a three-dimensional shape of one or more separator plates having at least one channel for the transport of media, the data file further defining cross sectional layers of the one or more separator plates;

using the computer to direct a deposition mechanism to sequentially deposit the flowable conductive material layer upon layer on the support platform according to the data file;

depositing the flowable material layer upon layer according to the data file to produce a first separator plate;

placing a membrane electrode assembly on the first separator plate in contact with the at least one channel;

locating a non-electrically conductive material on the first separator plate where the membrane electrode assembly does not extend;

depositing the flowable material layer upon layer according to the data file to produce a second separator plate, the second separator plate having at least one channel on a side facing the membrane electrode assembly and at least one channel on a side opposite the membrane electrode assembly wherein both channels are for the transport of media; and applying energy to one or more of each individual layer as it is being deposited.

It may be a further aspect of the method that said energy is heat added to at least the non-electrically conductive material so it softens to at least partially embed the membrane electrode assembly therein.

It may be a further aspect of the method that the conductive material is a carbon coated thermoplastic filament.

It may be a further aspect of the method that plasma or microwave (or plasma) energy is applied to each individual layer as it is being deposited.

It may be a further aspect of the method that the at least one channel is a plurality of meandering channels traversing from one side across a face of the first separator plate to an opposite side of the face and along the length of the face of the first separator plate.

It may be a further aspect of the method that the first separator plate includes a first opening at one end of, and in fluid communication with, the plurality of the meandering channels, and a second opening at another end of, and in fluid communication with, the meandering channel.

It may be a further aspect of the method that a fastener retainer is embedded into the first separator plate or the second separator plate.

It may be a further aspect of the method that a sensor is embedded in the first separator plate or the second separator plate.

Another aspect for a method of making an electrochemical cell may be printing a component of the electrochemical cell with an additive fabrication apparatus.

DETAILED DESCRIPTION

It is to be understood that the embodiments disclosed herein may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions or other physical characteristics relating to the embodiments disclosed are not to be considered as limiting.

Figure 1:
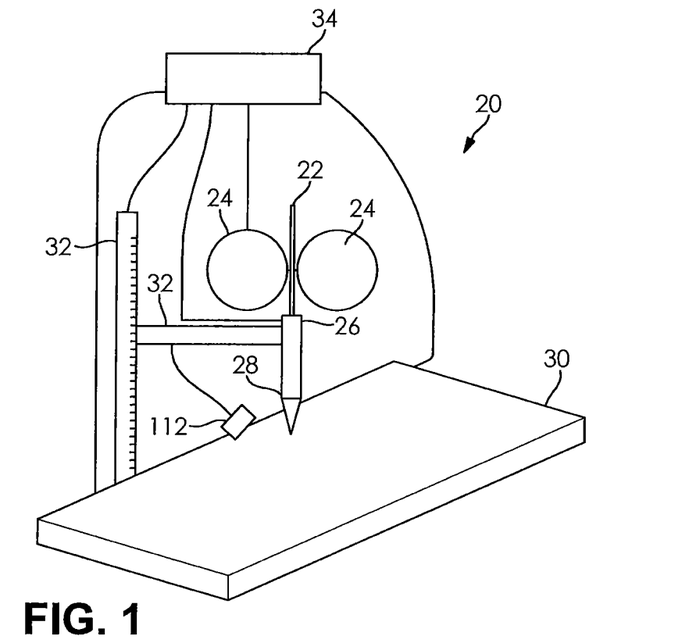
FIG. 1 shows a perspective view of one embodiment of a 3D printing or fused filament fabrication apparatus that can be used to produce structures according to the present disclosure.

In one embodiment, fuel cell components, and/or one or more fuel cells, are produced by an additive manufacturing process. One embodiment of an additive manufacturing apparatus and process is depicted in FIG. 1. The structures and methods depicted herein primarily relate to producing a fuel cell by an additive manufacturing process. It can be appreciated, however, that one or more fuel cell components, which may be individual or combined, in whole or in part can be selectively made using the process. In addition, one more fuel cells, in whole or in part, can be made using the process. The following will describe a process for making a fuel cell component which may also be part of a fuel cell.

Turning now to FIG. 1, one embodiment of the process is schematically depicted. A fuel cell component may be produced using a fused filament fabrication (FFF) apparatus 20 and process. While an FFF apparatus 20 and process is described and depicted, other additive manufacturing apparatus and processes may be used. The processes include, but are not limited to, Fused Deposition Modeling, Selective Laser Sintering, Selective Laser Melting, Electronic Beam Melting and Laminated Object Manufacturing.

FFF produces a structure by laying down, or depositing, layer upon layer of molten, or flowable, material which bonds together to form a 3D structure. In one embodiment of an FFF apparatus 20 shown in FIG. 1, material in the form of a solid filament 22 at room temperature is fed from a coil (not shown) via rollers 24, or another advancing device, to a heater or heating element 26 which changes the material to molten or flowable form. The temperature at which this occurs may be a first temperature. The temperature at which the material is a solid may be a second temperature where the second temperature is less than the first temperature. The material is then extruded by a depositing device or mechanism (such as a nozzle) 28 onto a base or platform 30. The material from the filament 26 will be referred to as material 26 herein.

The material 26 can be thermoplastic that is solid at room temperature but which becomes flowable when heated. In one embodiment, the material 26 is a carbon doped or impregnated thermoplastic material. In another embodiment, the material 26 may be such as carbon-coating filaments such as those available from Essentium Materials, 5880 Imperial Loop Dr #10, College Station, Tex. 77845. A thermoset material 26 may also be used. The material also may be such as a solid oxide or ceramic material.

Deposition device 28 can be mounted on one or more movable arms 32, or tracks, to move across the platform 30 along an x-y plane to deposit layers of the material 26 and vertically in the z-direction to add layers upon previously deposited layers all under control of computer 34. Alternatively, the base or platform 30 may move under computer control, or both the deposition mechanism and the platform can move under computer control to provide movement in the x, y and z planes. The speed of the deposition device may also be controlled (such as by the computer 34), which includes stopping and starting deposition, to form all types of 3D structures.

The desired structure to be fabricated can be defined in a computer aided design (CAD) file or other file readable by the computer 34 and may define the structure layer by layer in as fine a detail as necessary. These layers can comprise each component of the fuel cell (such as each layer is a component) or each component can be comprised of multiple layers.

While this description begins with printing an anode separator plate 36, the process is not limited to beginning with such a plate 36. Instead, as can be appreciated above, any component of the fuel cell can be printed, and in any order. It may, however, be more cost efficient and easier to print essentially from one end of the fuel cell to another end of the fuel cell in order so that all, or most, of the fuel cell components can be printed together. It is also permissible to print a bipolar plate comprised of one surface that faces an anode electrode cell and another surface that faces a cathode electrode cell.

Figure 2:
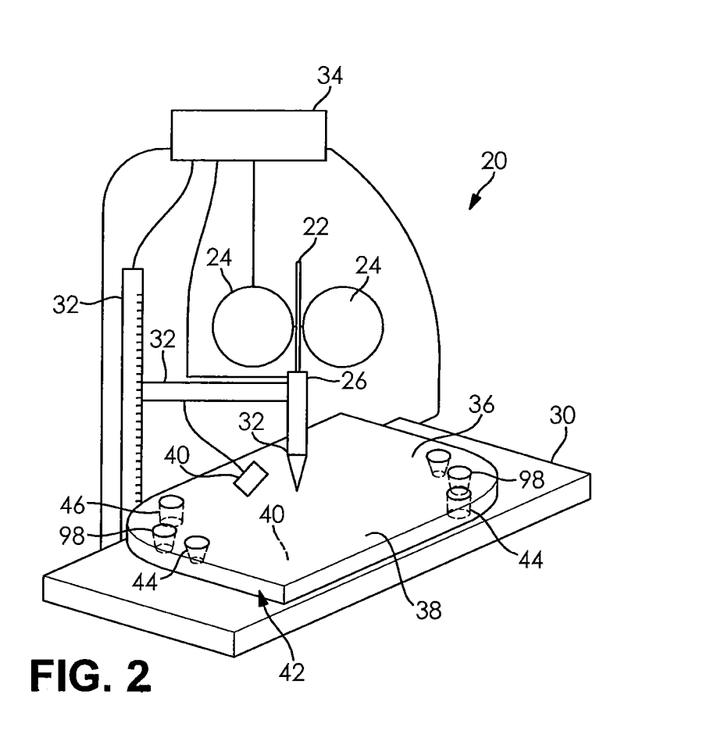
FIG. 2 depicts one embodiment an initial layer of one embodiment of an anode separator plate being printed on the apparatus of FIG. 1.

FIG. 2 depicts the apparatus of FIG. 1 wherein one embodiment of an anode separator plate 36 has begun to be printed. The anode separator plate 36 may have a square or rectangular perimeter or shape but the apparatus and method are not limited to that shape. Instead, it may be preferred to print the anode separator plate 36 in a shape other than square or rectangular as this may permit the plate 36, and any resulting fuel cell stack, to be accommodated in a non-traditional shape in a vehicle or other storage device.

FIG. 2 depicts what may be an initial deposit, or base layer, of material 22 perhaps comprising one or more layers of the anode separator plate 36. Fluid channels, which will be described in further detail below, may or may not be provided in the base layer. In the depicted embodiment, no channels are provided so the base layer may have a planar upper surface 38 and a planar lower surface 40.

In the initial deposit step, the outline or perimeter 42 of the anode separator plate 36 may be established. As can be seen in FIG. 2, the perimeter 42 of the anode separator plate 36 is not square or rectangular. Instead, the plate 36 in FIG. 2 has one embodiment of an irregular shape. In addition, one or more reactant supply 44 and/or exit 46 ports may begin to be located in the plate 36.

Figure 3:
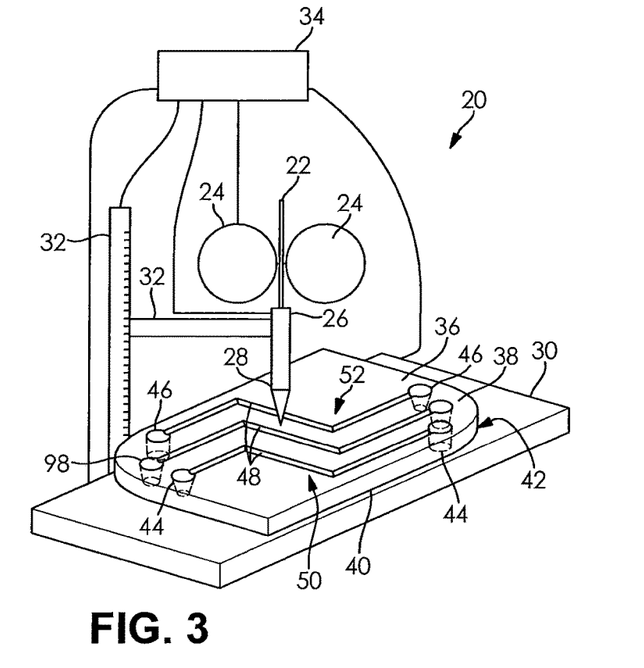
FIG. 3 depicts one embodiment of a printed anode separator plate being printed on the apparatus of FIG. 1.
Figure 3A:
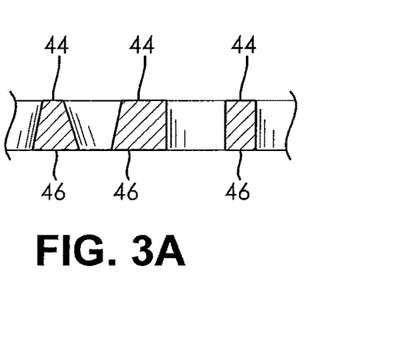
FIG. 3A depicts one embodiment of a cross-section along lines 3-3 of FIG. 3.

FIG. 3 depicts one embodiment of a completed anode separator plate 36 printed by the additive process. In this embodiment, the shape of the plate 36 has been further defined, and the supply/exit ports 44, 46 have also been further defined. By further defined, it is meant that the ports 44, 46 extend from one side of the plate 36, through the plate 36, to the other side of the plate 36. The depth of the ports 44, 46 is defined by the amount of material 22 added to the plate 36 through the printing process. As shown in FIG. 3A, the ports 44, 46 may be round in cross-section, or other shapes other than round. The shape of each port 44, 46 can be varied through the printing process thus the shape of each individual port 44, 46 can vary or the shapes of the various ports 44, 46 in the plate 36 can vary with respect to one another.

In addition, during the additive printing process after the base layer is printed, one or more channels 48 may be printed in the plate 36. More particularly, as shown in FIG. 3, a plurality of channels 48 may extend from one port 44, 46 to another port 44, 46 across one side, or face 52, of the plate 36. The channels 48 can extend, or meander, at least across a central area 50 of the face 52. The channels 48 may be enclosed on three sides with an open top side. The channels 48 may be formed, or printed, directly into the face 52 and may be comprised of grooves, or continuous depressions, in the face 52.

While one embodiment of the direction, number, shape and length of channels 48 is depicted in the figure, the process is not limited to these. For example, channels 48 of varying widths, depths, sizes and shapes can be simultaneously printed on the face 52. Of course, this printing can be done at the same time the plate 36 and/or ports 44, 46 are being printed.

The channels 48 can carry media such as reactants, cooling fluid and products of the fuel cell reaction. Although the individual channels 48 are depicted as being are separate from each other they can be placed in fluid communication via the ports 44, 46.

All of the foregoing information regarding layers/plates, channels, and ports can be stored in the above-mentioned data file or a separate data file in, or in communication with, the computer 34.

A gas diffusion layer (GDL) may be printed onto the anode separator plate 36. The same or different material 22 can be used to print the gas diffusion layer as used to print the anode separator plate 36. The GDL is not shown in the figures.

The GDL essentially acts as an electrode that facilitates diffusion of reactants across the catalyst layer. The surface area and porosity of the GDL is what allows for the transfer of reactants from the channels in the anode separator plate 36 and cathode separator plate (described below) to the catalyst area of the membrane.

The information about the materials, shape, size, and feature location for the GDL can be stored in the above-mentioned data file or a separate data file in, or in communication with, the computer 34.

In one embodiment, the GDL can comprise a carbon fibrous mat or paper which functions as a gas diffusion layer and has catalyst particles thereon. In one embodiment, the carbon fibrous mat or paper with or without the catalyst can be printed or deposited by the FFF apparatus 20. If the catalyst is not included in the deposited material it can be applied after in a second step.

Figure 4:
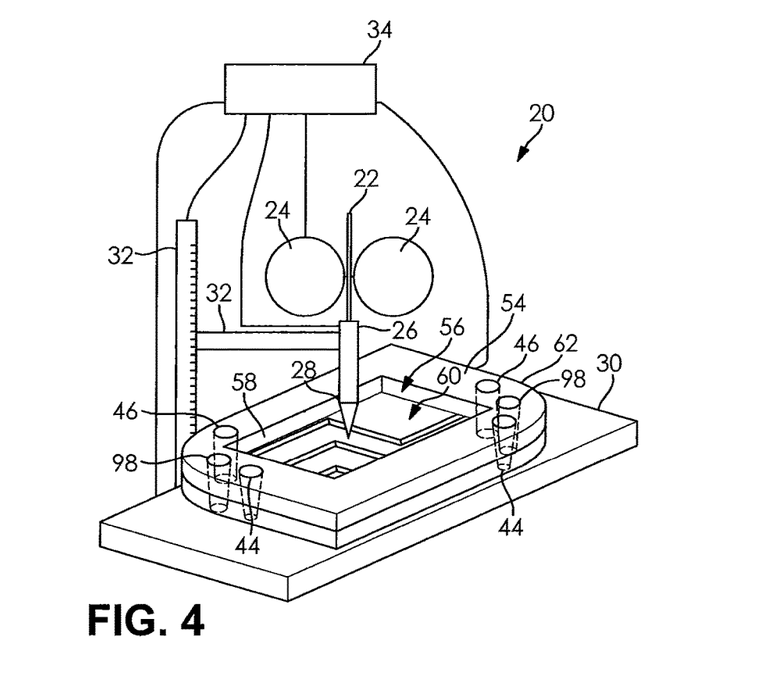
FIG. 4 depicts one embodiment of an electrically insulating material being located, or printed, on the printed anode separator plate.

FIG. 4 depicts locating an electrically insulating material 54 onto the anode separator plate 36. In the depicted embodiment, the material 54 is located directly on the face 52 of the anode separator plate 36 and around the perimeter 42 of the plate 36. The perimeter 42 may include the area that includes the ports 44, 46 and in some cases inboard of the ports 44, 46, such as into a portion of the central area 50. Preferably, the material 54 is continuous and uniform in its location, size and shape. The electrically insulating material 54 has a predetermined thickness and results in a pocket 56 being formed inboard of its inner edge 58. In other words, the electrically insulating material 54 may extend from the perimeter 42 of the anode separator plate 36, across the plate 36, wherein it may extend around and beyond the ports 44, 46 to a predetermined position inboard from the ports 44, 46. The continuous inner edge 58 of the electrically insulating material 54 defines a boundary for an exposed area 60 of the face 54 of the anode separator plate 36 where there is no electrically insulating material 54.

The electrically insulating material 54 insulates the anode separator plate 36 from the cathode separator plate. If the anode electrons generated in the reaction are able to participate in the cathode reaction in the same cell, a short circuit would result. Thus, the electrons would not travel outside of the cell to do work.

It may be that if an MEA is used that has an electrically-insulating film that extends to the edge of the cell, it may not be necessary to use the electrically insulating material 54 as described above.

The electrically insulating material 54 also has an outer edge portion 62. The outer edge portion 62 may follow and be aligned with the perimeter 42 of the anode separator plate 36.

The information about the materials, shape, size, and feature location for the electrically insulating material 54 can be stored in the above-mentioned data file or a separate data file in, or in communication with, the computer 34.

Reactant supply and exit ports 74, 76 may be located in the electrically insulating material 54. The ports 74, 76 in the material 54 are preferably aligned, and matched, with the ports 44, 46 in the anode separate plate 36. Together, at least these ports 44, 46, 74, 76 form reactant supply and exit manifolds 78, 80.

Figure 5:
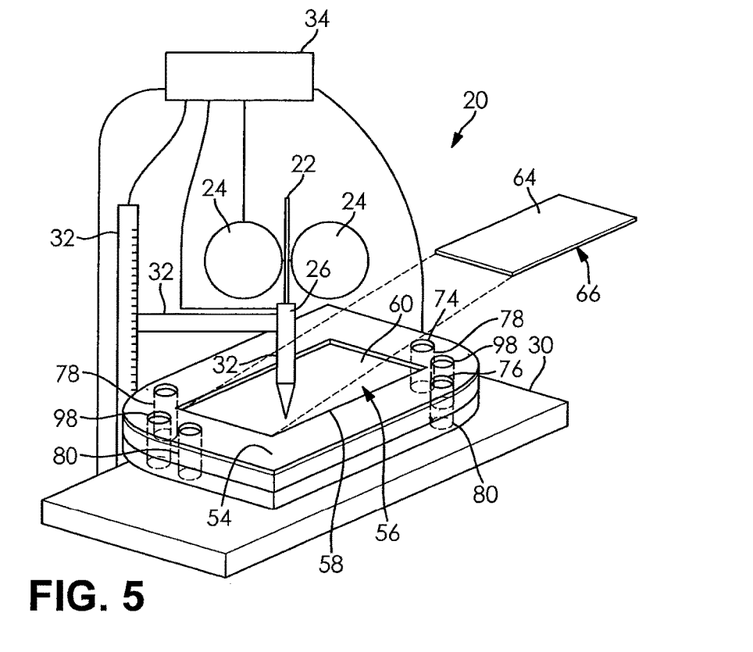
FIG. 5 depicts one embodiment of a membrane electrode assembly being located, or printed, on the printed anode separator plate and electrically insulating material.
Figure 6:
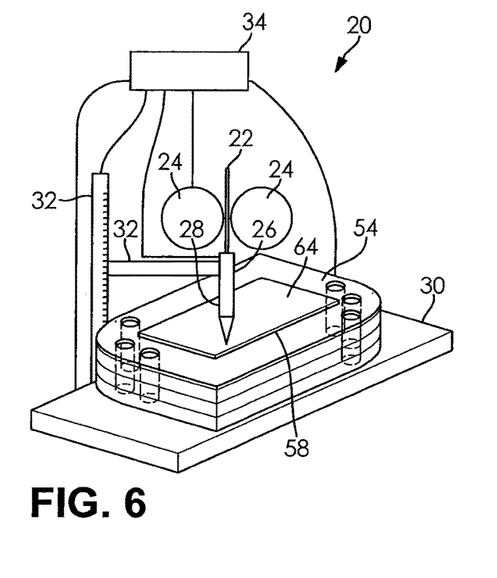
FIG. 6 depicts one embodiment of the membrane electrode assembly of FIG. 5 installed on the printed anode separator plate and the electrically insulating material.

The electrically insulating material 54 forms a frame for a membrane electrode assembly or MEA 64. As schematically shown in FIG. 5, the MEA 64 can be manually or robotically placed within the frame on the exposed face 60 of the anode separator plate 36. One embodiment of an MEA 64 located on the anode separator plate 36 in the electrically insulating material frame 54 is depicted in FIG. 6. Namely, a face 66 of the MEA 64 is in direct contact with the face 60 of the anode separator plate 36 while the perimeter edge 42 of the MEA 64 is in direct contact with the electrically insulating material 54.

The MEA 64 is the core component of a fuel cell that helps produce the electrochemical reaction needed to separate electrons. On the anode side of the MEA 64, a fuel (hydrogen, methanol etc.) is catalytically split into protons, electrons, and other reaction products. The protons diffuse through the membrane and are met on the cathode side by an oxidant (oxygen or air) which bonds with the protons simultaneously receiving the electrons that were separated from the fuel. Catalysts on each side enable reactions and the MEA 64 allows protons to pass through while keeping the gases separate. In this way cell potential is maintained and current is drawn from the cell producing electricity.

A typical MEA 64 is composed of a polymer electrolyte membrane with catalyst layers applied to both the anode and cathode sides. This is typically called a 3-Layer MEA. If the two Gas Diffusion Layers are included in the MEA, it is typically called a 5-Layer MEA.

Figure 7:
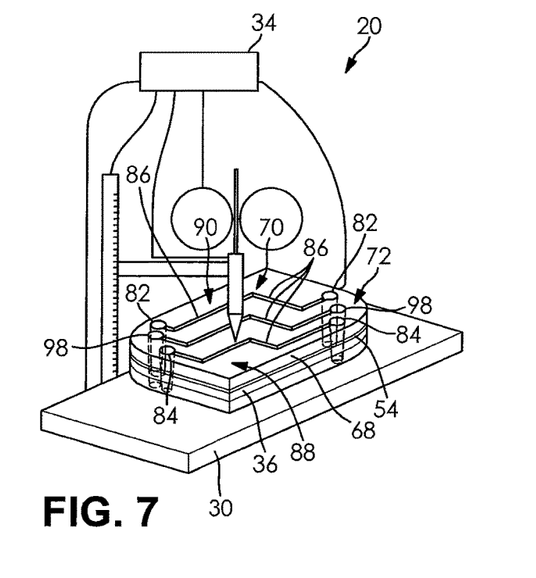
FIG. 7 depicts one embodiment of an initial layer of a cathode separator plate being printed.

Turning to FIG. 7 the start of another layer in the printing process is schematically depicted. In FIG. 7, the initial layers of a cathode separator plate 68 have been laid down. The layers have been located directly over, and in direct contact with, the electrically insulating material 54 and the MEA 64. Namely, the initial layers of a central area 70 of the cathode separator plate 68 are directly over and in direct contact with a cathode side of the MEA 64 while an outer edge area 72 of the cathode separator plate 68 is directly over and in direct contact with the electrically insulating material 54.

One more reactant supply and/or exit ports 82, 84 may be defined in the plate 68. The ports 82, 84 are preferably aligned and matched with ports 74, 76 thus extending manifolds 78, 80.

In addition, one or more MEA sided channels 86 may be printed in the plate 68. More particularly, as shown in FIG. 7, a plurality of MEA sided channels 86 may extend from one port 82, 84 to another port 82, 84 across one side, or face 88, of the plate 68. The MEA-sided channels 86 can extend, or meander, at least across a central area 90 of the face 88. The MEA-sided channels 86 may be enclosed on three sides with an open top side. The MEA-sided channels 86 may be formed, or printed, directly into the face 88 and may be comprised of grooves, or continuous depressions, in the face 88.

While one embodiment of the direction, number, shape and length of channels 86 is depicted in the figure, the process is not limited to these. For example, channels 86 of varying widths, depths, sizes and shapes can be simultaneously printed on the face 88. Of course, this printing can be done at the same time the plate 68 and/or ports 82, 84 are being printed.

The additive printing process adds one or more layers to the cathode separator plate 68 so that the MEA-sided channels 86 are further defined with side walls and a bottom.

Figure 7A:
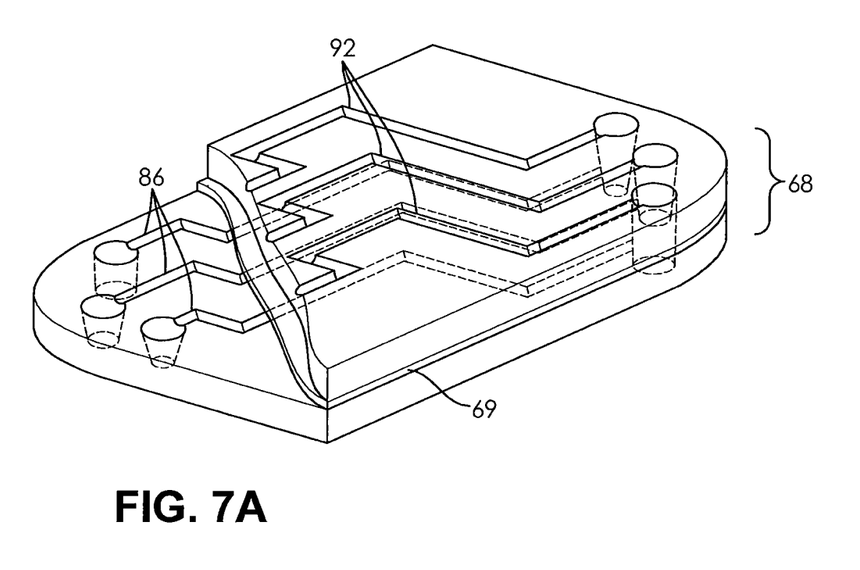
FIG. 7A depicts one embodiment of a permeation layer added to the cathode separator plate.

FIG. 7A depicts an alternative embodiment wherein a permeation barrier is located in the plate 68. The permeation barrier may be located in the plate 68 between the channels 86 and coolant channels 92 (described below). The permeation barrier may be such as a metal foil or metal plate 69. While metal is suggested for the plate 69 other materials with functionally similar characteristics may be used. The plate 69 may be unitary, one piece and integrally formed. The permeation barrier blocks or prevents gas, such as hydrogen in channels 86, from permeating into the coolant channels 92.

Figure 8:
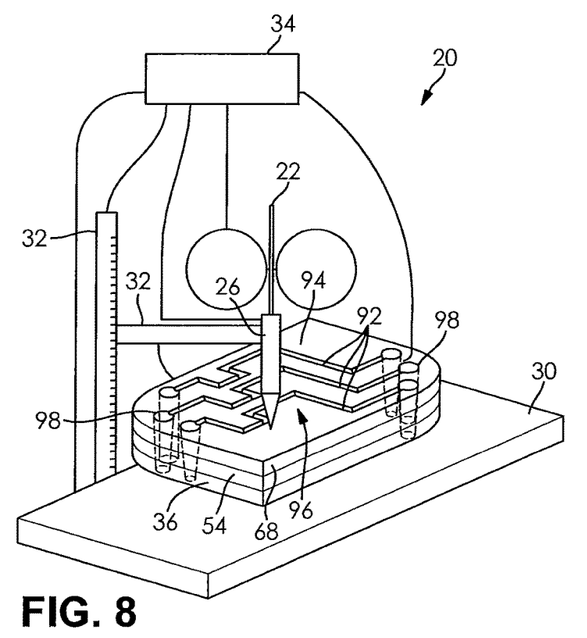
FIG. 8 depicts one embodiment of another layer of the printed cathode separator plate being printed on the apparatus of FIG. 1.

In addition, the process may print one or more coolant channels 92 in one or more layers of the cathode separator plate 68. The coolant channels 92 may extend across a face 94 of the partially formed plate 68. The channels 92 can extend, or meander, at least across a central area 96 of the partially formed plate 68, as shown in FIG. 8.

As the printing process continues, the channels 92 are further formed and defined. The channels 92 can have any cross-sectional area including constant or variable within a single channel or within adjacent or non-adjacent channels. The channels 92 are in communication with a coolant port 98.

In the depicted embodiment, the channels 92 may have a round cross-sectional area. Thus, the printing process comprises printing a concave lower wall, rounded side walls and a concave upper wall until the channels 92 are fully enclosed within the plate 68.

Figures 9, 10:
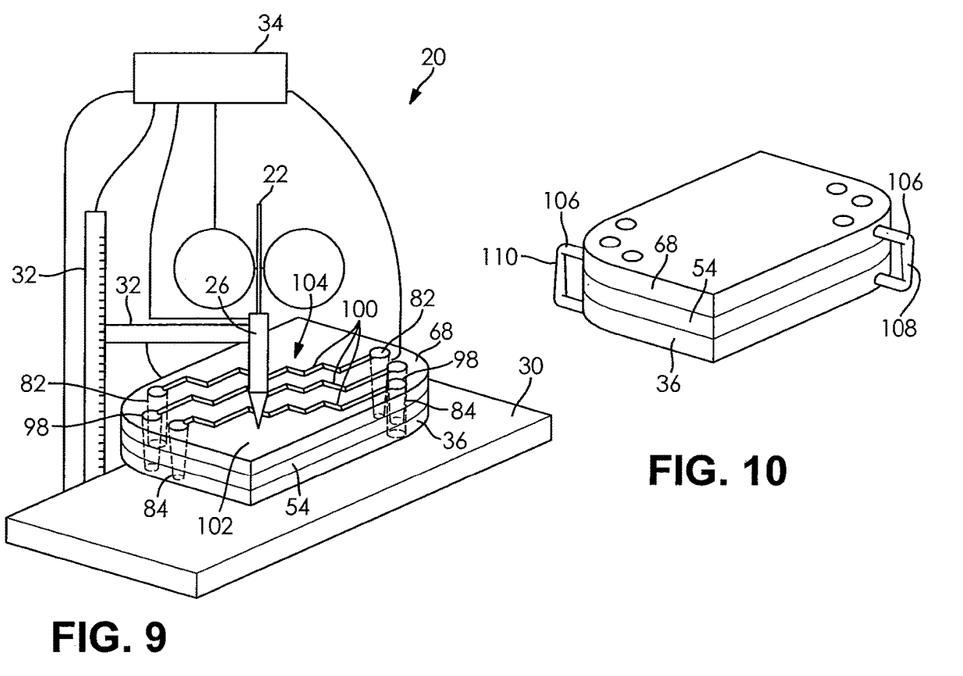
FIG. 9 depicts on embodiment of another layer of the printed cathode separator plate being printed on the apparatus of FIG. 1.
FIG. 10 depicts one embodiment of an external manifold for an electrochemical cell.

Additional printed layers are added to the cathode separator plate 68 such that a bipolar plate side 100 of the cathode separator plate 68 is formed, as shown in FIG. 9.

A gas diffusion layer (GDL) (not shown) may be printed onto the bipolar plate side 102 of the cathode separator plate 68. The same or different material can be used to print the gas diffusion layer as used to print the cathode separator plate 68.

In one embodiment, the GDL can comprise a carbon fibrous mat or paper which functions as a gas diffusion layer and has catalyst particles thereon. In one embodiment, the carbon fibrous mat or paper with or without the catalyst can be printed or deposited by the FFF apparatus. If the catalyst is not included in the deposited material it can be applied after in a second step.

FIG. 9 depicts one embodiment of a completed cathode separator plate 68 printed by the additive process. In this embodiment, the shape of the plate 68 has been further defined, and the supply/exit ports 82, 84, as well as coolant ports 98 have also been further defined. By further defined, it is meant that the ports 82, 84, 98 extend from one side of the plate 68, through the plate 68, to the other side of the plate 68. The depth of the ports 82, 84, 98 is defined by the amount of material added to the plate 68 through the printing process. The ports 82, 84, 98 may be round in cross-section, or other shapes other than round. The shape can of each port 82, 84, 98 can be varied through the printing process thus the shape of each individual port 82, 84, 98 can vary or the shapes of the various ports 82, 84, 98 in the plate 68 can vary with respect to one another.

The bipolar plate side (opposite the MEA side) of the cathode separator plate 68 is defined by the ports 82, 84, 98. In addition, one or more bipolar plate side channels 100 may be printed in the cathode separator plate 68. More particularly, as shown in FIG. 9, a plurality of bipolar plate side channels 100 may extend from one port 82, 84 to another port 82, 84 across a bipolar plate side 102 of the plate 68. The bipolar plate side channels 100 can extend, or meander, at least across a central area 104 of the side 102. The bipolar plate side channels 100 may be enclosed on three sides with an open top side. The bipolar plate side channels 100 may be formed, or printed, directly into the side 102 and may be comprised of grooves, or continuous depressions.

While one embodiment of the direction, number, shape and length of channels 100 is depicted in the figure, the process is not limited to these. For example, channels 100 of varying widths, depths, sizes and shapes can be simultaneously printed on the side 102. Of course, this printing can be done at the same time the plate 68 and/or ports 82, 84 are being printed.

In an embodiment of the process, any one of the plates 36, 68 can have one or more channels 48, 86, 92, 100 printed with varying widths at different positions or areas of the plates 36, 68. Channels of various sizes and shapes may affect, regulate and/or alter the rate of reaction occurring in the fuel cell.

In addition, in the same, or a different embodiment, one or more of the ports 44, 46, 74, 76, 98 can vary in their cross-sectional area. Namely, the one or more ports 44, 46, 74, 76, 98 can have different shapes and or sizes. Varying the cross sectional area may affect, regulate and/or alter the rate of fluid flow, or pressure, through the cell, which may alter the rate of reaction occurring in the cell.

Figure 11:
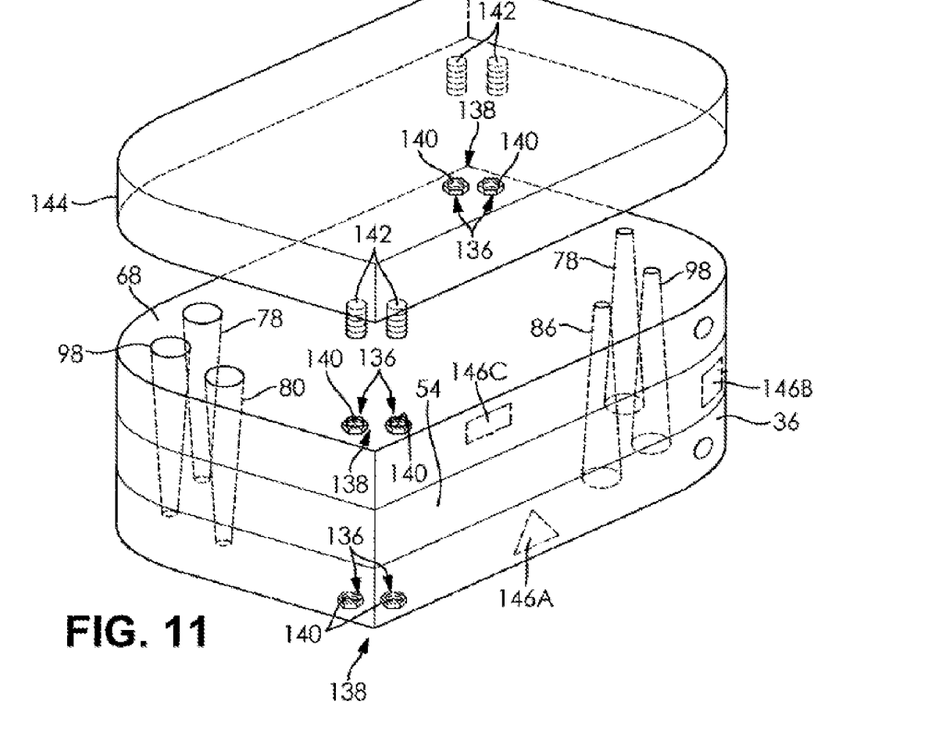
FIG. 11 depicts embodiments of internal manifold cross-sectional shapes.

FIG. 11 schematically depicts one such embodiment. While FIG. 11 depicts one embodiment of the ports that form manifolds, other shapes, sizes, numbers, etc. may be used. By way of one example, when the assemblies described above are combined to create a fuel cell, the ports 44, 46, 74, 76, 98 align to form respective fluid manifolds. In the case where multiple fuel cells are combined the fluid manifolds in the stacked fuel cell can become so long that fluid flow through the manifolds differs at different parts of the manifold and stack. By varying the cross-sectional area of the ports 44, 46, 74, 76, 98, and thus the manifolds, via the printing process, the fluid performance (e.g., velocity and/or pressure) of the manifolds can be adjusted to desired performance. Namely, it may be at the beginning of the fuel cell stack one manifold has a cross sectional area of X, whereas as the end of the fuel cell stack the same manifold has a cross sectional area of Y, where Y is less than X. In this case, physics teaches that the fluid in the cross-sectional area of Y will be faster/greater than in the cross sectional area of X. Thus, a simple, cost effective and reliable way of adjusting or tailoring the fluid flow along the manifolds of a fuel cell can be obtained via the above-described process.

By way of example, for cells that might require additional cooling, the manifold could be designed to channel the coolant into that cell at a faster rate to remove more heat. It can also be appreciated that, the coolant channels of that particular cell could be modified to have a different cross-section so that more (or less) cooling can take place. The manifold and the cooling channel can also be modified by other features such as by including internal structures to create desired fluid flow dynamics such as turbulizing features or effects.

In another embodiment, a manifold tube 106 external to one or more of the plates 36, 68 or layers could be a printed from a non-electrically conductive material, as shown in FIG. 10. It can be appreciated that the external manifold tube 106 can have different cooling properties than a manifold located within the cell or a layer since the tube 106 is not as directly affected by the heat in the layer or tube. The tube 106 can be printed at the same time or at a different time than the layers are printed. The tube 106 can be printed with the layers or separately and then later joined. The tube 106 can replace an internal port/manifold or supplement it.

As with the above described manifolds, the cross-sectional areas of the tubes 106 can be changed over their length so that the performance of the fluids that flow within them can be tailored to the need. By way of one example, in the depicted embodiment in FIG. 10, the first external manifold tube 108 has been printed so that it tapers down from top to bottom while the second external manifold tube 110 has been printed so that it tapers down from bottom to top.

In one embodiment, the FFF apparatus 20 can include an energy emitting device 112 for dispensing energy towards the material 22 being deposited, or that has been deposited, to heat or cause the material 22 to heat. Such a device 112 is schematically depicted in FIG. 1. While only depicted on FIG. 1, the device 112 can be used in any or all of the steps/figures herein. The energy emitting device 112 can be associated with the FFF apparatus 20, or it may be separately located, or disconnected, therefrom.

In any case, the deposited material 22 can remain in a molten state for an extended period of time or re-melted if solidified to ensure bonding of individual sections and/or adjacent sections of deposited material. In one embodiment, the energy dispersed can be heat energy such as infrared radiation, plasma energy or microwave electromagnetic energy. In one embodiment, the emitting device 112 emits plasma beams onto the deposited material 22 which warms, heats, or maintains the molten state of the deposited material 22. In another embodiment, the emitting device 112 emits microwave radiation which is absorbed by the carbon in the filament and heats the deposited material 22. In yet another embodiment, emitting device 112 can emit infrared radiation continually to maintain the build area at a predetermine temperature to maintain the deposited material 22 in a semi-flowable state.

The energy can be emitted as material 22 is being deposited. Alternatively, energy can emitted after each completed layer has been deposited and prior to the deposition of the next layer upon the underlying layer. In another embodiment, each layer can be irradiated by another device such as by placement of the partially printed structure in a microwave chamber before depositing the next layer thereon to ensure the next layer is deposited on still molten or flowable material for improved bonding between the layers. In yet another embodiment, after any layer has been fabricated the entire layer may be irradiated to cause interlayer bonding either by the energy emitting device or another apparatus. The re-heating re-melting and re-solidification process produces stronger bonding along sections of deposited material 22, between sections of a single layer in the x-y plane, and between the layers in the z-direction. This improved bonding can lead to improved structural integrity of the layers and the improved conductivity throughout the layers and between the layers in the z-direction.

By way of one example, the area 50 on the anode separator plate 36 receiving the MEA, or the MEA itself, can be heated prior to placement of the MEA on the anode separator plate 36 such that some of the carbon fibers of the gas diffusion layer of the MEA sink into or embed to a certain depth into the anode separator plate 36 to reduce the electrical resistance between the gas diffusion layer and the anode separator plate 36. The gas diffusion layer should not embed too deeply so as to prevent reactants from diffusing through the pores of the gas diffusion layer to the catalyst particles. In another embodiment, the same process can be used with an anode or cathode layer having a gas diffusion layer. In other words, one of the anode or cathode layers, or the area of separator plate receiving the same, can be heated to allow embedding of the gas diffusion layer.

At any of the above-mentioned steps, a coating (not shown) can be applied to the channels or ports whether partially or fully formed. The coating can be hydrophilic or hydrophobic in nature to aid with water management or media distribution. A sprayer (not shown) can be associated with the FFA apparatus 20 to spray on the material and allowed to cure in place if necessary.

In another embodiment, at any of the above-mentioned steps, a locating feature (not shown) can be printed on any of the layers or plates 36, 68. The locating feature might be a printed pattern or a raised feature. The locating feature might be used by the FFF apparatus 20, such as computer 34, to know where subsequent layers, plates or other features of the cell should be located with respect to previous layers.

An automated visual system (not shown) can be used to take a picture or otherwise image any layer, or layer portion, to ensure quality control. The automated system can be connected to the computer 34 to stop the process if the layer was placed incorrectly or misaligned.

In another embodiment, an activation step may be used. The activation step can be used to cure the conductive material 22. The activation step can be thermal and/or chemical in nature. For example, the activation step may comprise exposure of the material 22 to another substance, such as water or humidity to promote curing. The step may also comprise mixing the conductive material 22 with another material to promote curing of the conductive material 22. The mixing can occur when the conductive material 22 is being deposited, or at some time after. Curing can also be accomplished through radiation, such as through plasma or microwave energy or ultra-violet light or infrared light that is directed to the conductive material 22. The activation, or curing, step may facilitate bonding or joining of the conductive material 22 to itself and to adjacent structures.

The fuel cell produced using the FFF apparatus 20 described above can be connected to other fuel cells to create a fuel cell stack. Individually fabricated fuel cells can be assembled into a fuel cell stack by manually attaching or securing the fuel cells together using attachment hardware as known in the art.

Fuel cells are typically counter-flow or co-flow, which describes which way the reactants flow across the cell faces. For example, in a co-flow cell, hydrogen and oxygen enter on the same side, or end, of the cell and exit on the same side, or end, of the cell. The hydrogen may flow across one cell face while the oxygen flows across the opposite cell face. In a counter-flow cell, hydrogen enters on the side of the cell where oxygen exits and vice versa. The hydrogen may flow across one cell face while the oxygen flows across the opposite cell face. For traditional manufacturing, the design is fixed co-flow or counter-flow—there's no way to change it since the reactants enter the manifolds at the end of the stack.

Figure 12:
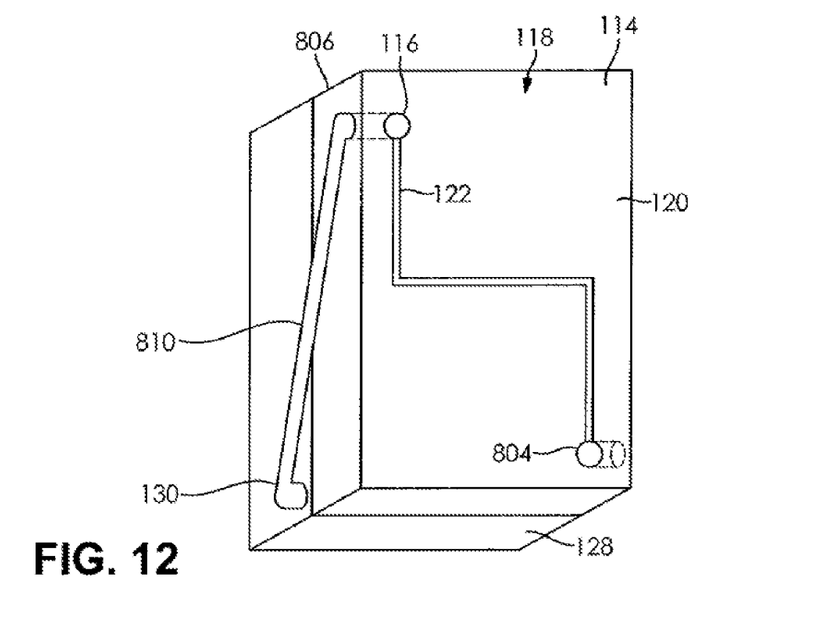
FIG. 12 depicts one embodiment of external fluid manifolds.

The present device and method permits one to not only print but also route the manifold tube 106 to enter a plate such that one cell can be co-flow, and the adjacent cell be counter flow. An example is schematically depicted in FIG. 12. FIG. 12 depicts a first cell 114 having an inlet 116 on a first end portion 118 of the cell 114. Fluid flow may be across the cell face 120 to an outlet 124 opposite the inlet 116 on a second end portion 126 the cell 114.

A second cell 128 in at least one channel 122 is located directly adjacent the first cell 114. The second cell 128 may have an inlet 130 adjacent the first cell outlet 124. For example, the inlet 130 may be at an end portion 132 of the second cell 128. The end portion 132 may be such as directly adjacent the end portion 126.

A manifold 134 external to both cells 114, 128 may connect the second cell inlet 130 to the first cell inlet 116. It can be appreciated that the manifold may extend internally through one or both cells 114, 128. Thus, a co-flow/counter flow set up can be easily created in directly adjacent cells using the above-described additive process.

Returning back to FIG. 11, it depicts another possible feature. The feature comprises at least one fastener retainer 136 located in at least one of the anode separator plate 36, the electrically insulating material 54 and/or the cathode separator plate 68.

In FIG. 11, two fastener retainers 136 are depicted in the anode separator plate 36 and two fastener retainers 136 are depicted in the cathode separator plate 68. While the fastener retainers 136 are depicted in the plates 36, 68 in certain locations, other locations are permissible. FIG. 11 depicts the fastener retainers 136 in corner portions 138 of the plates 36, 68. These corner portions 138 may be where there are no channels or other openings in the plates 36, 68 so as not to interfere with them. In addition, while two fastener retainers 136 are depicted in the plates 36, 68, a greater number or fewer number are permissible.

The fastener retainers 136 are preferably provided in the plates 36, 68 when the plates 36, 68 are being printed. The fastener retainers 136 may be separate structures that are inserted into the plates 36, 68 or they may be made by, and during, the same printing process that creates the plates 36, 68, or they may be printed separately and then inserted into the plates 36, 68. In any case, it is preferred that the fastener retainer 136 is immovably secured, or fixed, to the plate 36 or 68.

In one embodiment, the fastener retainers 136 may be receptacles, or connections, for fasteners. In FIG. 11, the fastener retainers 136 may be such as structures with an opening 140 for receiving a fastener 142 therein. The area about, or defining, the opening 140 may be threaded if the fastener 142 is threaded so that fastener 142 can be secured to the fastener retainer 136.

By way of one example only, the fastener retainer 136 may be such as a hexagonal nut that has been partially overprinted by the above-mentioned printing process into one of the plates 36, 68. Preferably, the printing process has not blocked the opening 140 in the nut, but instead, the printing process has secured the nut such that it cannot be easily removed from the plates 36, 68.

In yet another embodiment (not shown), the fastener retainer may be such as one half of a snap fitting. The snap fitting half can be provided on one of the plates 36, 68 as noted above, such as by printing. The fastener may be such as the other half of the snap fitting.

An end cap, or cover, 144 may be at least partially located over one or more plates 36, 68. The end cap may be secured to the plates 36, 68 via the fastener 142 connecting with the fastener retainer 136. In one embodiment, the fastener 142 may be connected with the end cap 144, or extend into the end cap 144, to engage with the fastener retainer 136.

FIG. 11 also depicts at least one sensor 146. In the depicted embodiment, at least one sensor 146A is located in the anode separator plate 36, at least one sensor 146B is located in the electrically insulating layer 54 and at least one sensor 146C is located in the cathode separator plate 68.

While FIG. 11 depicts the sensors 146A-C in one location in the plates/layers 36, 54, 68 the sensors are not limited to these locations. Further, while only one sensor 146A-C is located in each plate/layer 36, 54, additional sensors are permissible.

As shown in FIG. 11, the sensors 146A-C may be embedded in their respective plate/layers 36, 54, 68 during the above-described printing process. By way of example only, it can be seen that sensor 146A may have been embedded as the anode separator plate 36 was initially being formed. Sensor 146B, however, may have been embedded in the electrically insulating layer 54 half way through its completion. Finally, sensor 146C may have been embedded in the cathode separator plate 68 near its completion.

The sensors 146A-C may be the same, they may be different or they may be combinations of sensor types. By way of example only, the sensors 146A-C may be such as thermocouples or cell voltage sensors. In any case, sensors can be embedded to monitor conditions including, but not limited to, temperature, cell voltage, humidity, and/or concentration of chemicals.

The sensors 146A-C may be wired or wireless to provide their sensed data or conditions to a controller (not shown). In the embodiment where the sensors 146A-C may be wired the wire for the sensors 146A-C may extend from the plates 36 or 68, or the electrically insulating material 54. The wires can then be connected up to a controller.

Figure 13:
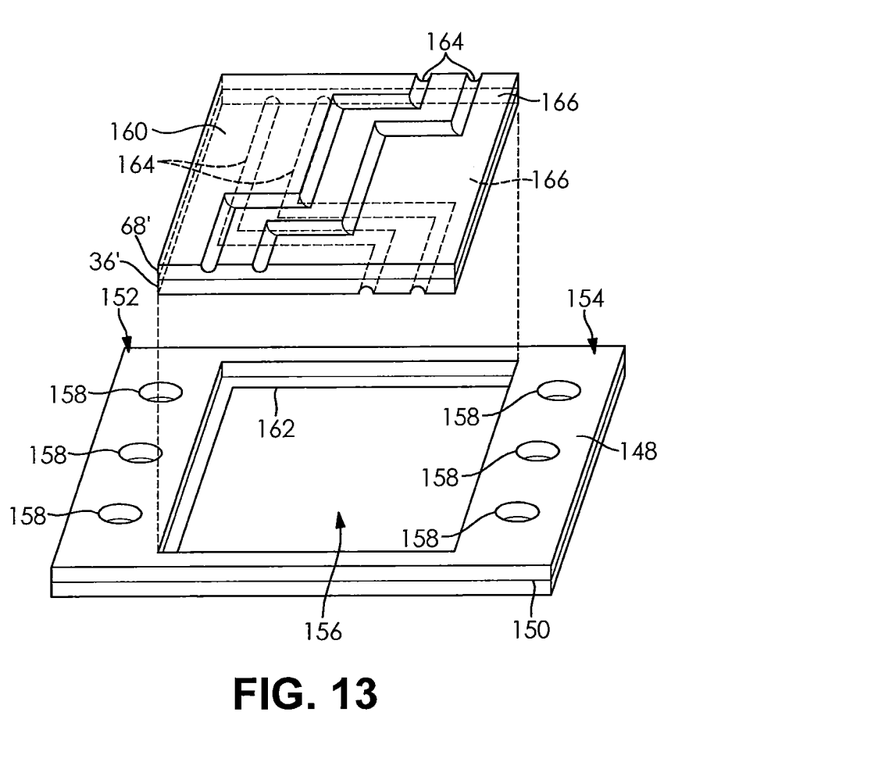
FIG. 13 depicts another embodiment of a printed frame with a manifold where the frame receives components of the electrochemical cell.

Turning now to FIG. 13, another embodiment of a printed frame 148 is depicted. FIG. 13 depicts a finished printed frame 148, however, based on the description above, it can be appreciated that the frame 148 can be printed in layers or portions, in the manner described above.

The frame 148 may have a polygon shaped perimeter 150 but other shapes, such as shapes needed to fit within a particular vehicle area, may be used.

The frame 148 may define at least one manifold area. In the depicted embodiment in FIG. 13, first and second manifold areas 152, 154 are shown. The two manifold areas 152, 154 are on opposite sides of the frame 154 and separated by a central opening 156. Two manifold areas 152, 154 are shown, but a greater or fewer number may be present. The manifold areas 152, 154 may be of the same size and shape, but other designs are permissible.

Each manifold area 152, 154 in the figure depicts three fluid openings 158, but a greater or fewer number of fluid openings 158 may be used. The fluid openings 158 are equal size and shape but here again, openings 158 of different sizes and shapes may be used. Further, the fluid openings 158 may change as they extend through the frame 148. For example, via the printing process, the cross sectional area of the individual fluid openings 158 can be varied to change the flow through each of the fluid openings 158.

The central opening 156 can also be formed from the printing process. The central opening 156 may be polygonal in shape, but other shapes are permissible. Preferably, the central opening 156 has a complementary shape an insert 160.

The insert 160 may be comprised of an anode separator plate 36' and a cathode separator plate 68'. Primes are used with plates 36' and 68' to designate that the plates 36', 68' may be the same as plates 36, 68 or they may be different. By way of one example of one possible difference, plates 36' and 68' may have different cooling fluid channels.

The plates 36', 68' may be printed contemporaneously with the frame 148 or they may be separately printed and joined later. In any case, it is preferable for the plates 36', 68' to be joined with the frame 148. They may be joined via emitting device 112, or similar structure, so that the plates 36', 68' and/or frame 148 melts with one another. Additionally, or alternatively, the apparatus 20 may print material to join the plates 36', 68' and frame 148. It is desirable to join the plates 36', 68' together to provide an electrical pathway between them. It is also desirable to seal any intersection between the insert 160 and the frame 148 to prevent reactant gasses from flowing through the frame 148 and insert 160 assembly.

The plates 36', 68' may be supported by the frame 148. In the embodiment, depicted in FIG. 13, the plates 36', 68' may rest on a flange 162 surrounding the central opening 156. The frame 148 may define a thickness of which the flange 162 only takes a small portion. The flange 162 may extend entirely around the central opening or only selected areas of the central opening 156.

The plates 36', 68' may have cooling fluid channels 164. The channels 164 may be formed with the plates 36', 68' are printed. In the embodiment depicted in FIG. 14, the channels 164 may be defined on the outer surfaces 166 of each plate 36', 68'. The channels 164 in the figure are depicted as open channels 164 because complementary plates 36', 68' from another frame (not shown) are located above and below the plate channels 164 that close the open channels 164. It may also be that the channels 164 in the plates 36', 68' are embedded and thus enclosed by the plates 164 when the plates 164 are printed.

In accordance with the provisions of the patent statutes, the present invention has been described in what is considered to represent its preferred embodiments. However, it understood that this description and the present embodiments shall not be construed in a limiting sense and that the invention can be practiced otherwise than as specifically illustrated and described without departing from the true spirit and scope of the invention which is defined by the following claims. Furthermore, it will be appreciated that any changes and modifications would be recognized by those skilled in the art as an equivalent to one or more elements recited in the following claims, and shall be covered by such claims to the fullest extent permitted by law.

The invention claimed is:

1. A method of making a component for an electrochemical cell, comprising:
   a. providing an additive fabrication apparatus for producing 3D objects, the additive fabrication apparatus comprising a support platform having a build area for producing a three-dimensional object on the support platform, and a movable deposition device for depositing a flowable, electrically conductive material on the build area;
   b. heating the conductive material with a heating device above a first temperature to provide the flowable, conductive material to the deposition device, the flowable material solidifying below a second temperature;
   c. moving the movable deposition device to deposit the flowable conductive material on the build area of the support platform to produce an anode separator plate having at least one channel for transport of media;
   d. placing a membrane electrode assembly on the anode separator plate in direct contact with the at least one channel of the anode separator plate;
   e. locating a non-electrically conductive material on the anode separator plate where the membrane electrode assembly does not extend, the non-electrically conductive material forms a frame for the membrane electrode assembly; and
   f. moving the movable deposition device to deposit the flowable conductive material upon the membrane electrode assembly and the non-electrically conductive material to produce a cathode separator plate, the cathode separator plate having at least one channel on a side facing the membrane electrode assembly for transport of media,
   wherein the conductive material is a carbon coated thermoplastic filament.

2. The method of claim 1, wherein a cross-sectional area of the channel is varied as it is being deposited.

3. The method of claim 1, further comprising using the apparatus to print a plurality of channels in the component and one or more manifolds in communication with the channels.

4. The method of claim 1, wherein the channel is printed to be a meandering channel traversing from one side across a face of the component to an opposite side of the face and along a length of the face of the component.

5. The method of claim 4, wherein the component is printed to include a first opening at one end of, and in fluid communication with, the meandering channel, and a second opening at another end of, and in fluid communication with, the meandering channel.

6. The method of claim 1, wherein the component is printed to further comprise a bipolar plate side on the cathode separator plate.

7. The method of claim 6, wherein said bipolar plate side of the cathode separator plate is arranged opposite the membrane electrode assembly, and wherein said bipolar plate side comprising at least one channel for transport of media.

8. The method of claim 4, wherein said component is printed to comprise the anode separator plate with an anode separator plate meandering channel printed on one side of the anode separator plate and further comprising,
- adding the electrically insulating material about the anode separator plate,
- placing the membrane electrode assembly on the anode separator plate,
- printing the cathode separator plate with initially flowable deposited material on the membrane electrode assembly and the electrically insulating material, wherein said cathode separator plate is printed with a first cathode plate meandering channel on a first side and a second cathode plate meandering channel on a second side.

9. The method of claim 8, further comprising applying energy to one or more of the anode separator plate, the cathode separator plate, the electrically insulating material or the membrane electrode assembly.

10. The method of claim 9, wherein the energy causes the anode separator plate to become flowable so that the membrane electrode assembly becomes embedded in the anode separator plate.

11. The method of claim 4, wherein one or more manifolds printed into the anode and cathode separator plates are printed with a variable cross section to vary a flow rate of fluid within the manifolds.

12. A method of making a component for an electrochemical cell, comprising:
   a. providing an additive fabrication apparatus for producing 3D objects, the additive fabrication apparatus including a support platform for supporting fabrication of a three-dimensional object thereon;
   b. heating a conductive material above a first temperature to provide flowable conductive material to a deposition mechanism, the flowable material solidifying below a second temperature;
   c. depositing the flowable material upon the support platform according to a data file to produce a first separator plate supported on the support platform, said first separator plate deposited to have at least one channel for the transport of media therethrough;
   d. placing a membrane electrode assembly on the deposited first separator plate in direct contact with the at least one channel of said first separator plate;
   e. locating a non-electrically conductive material on the first separator plate where the membrane electrode assembly does not extend, the non-electrically conductive material forms a frame for the membrane electrode assembly;
   f. depositing the flowable material upon the membrane electrode assembly and the non-electrically conductive material to produce a second separator plate, the second separator plate having at least one channel on a side facing the membrane electrode assembly and at least one channel created by the deposited material on a side opposite the membrane electrode assembly created by the deposited material wherein both channels are for the transport of media; and
   g. applying energy to one or more of each individual layer as it is being deposited,
   wherein the conductive material is a carbon coated thermoplastic filament.

13. The method of claim 12, wherein said energy is heat added to at least the non-electrically conductive material so it softens to at least partially embed the membrane electrode assembly therein.

14. The method of claim 12, wherein plasma or microwave energy is applied to each individual layer as it is being deposited.

15. The method of claim 12, wherein the at least one channel is deposited to comprise a plurality of meandering channels traversing from one side across a face of the first separator plate to an opposite side of the face and along the length of the face of the first separator plate.

16. The method of claim 12, wherein the first separator plate is deposited to include a first opening at one end of, and in fluid communication with, the plurality of the meandering channels, and a second opening at another end of, and in fluid communication with, the meandering channel.

17. The method of claim 12, wherein one or more manifolds printed into the first and second separator plates are printed with a variable cross section to vary a flow rate of fluid within the manifolds.

18. The method of claim 12, wherein a fastener retainer is embedded into the first separator plate or the second separator plate.

19. The method of claim 12, wherein a sensor is embedded in the first separator plate or the second separator plate.

20. The method of claim 12, further comprising locating a permeation barrier in the second separator plate between the at least one channel on a side facing the membrane electrode assembly and the at least one channel on a side opposite the membrane electrode assembly.

21. A method of making an electrochemical cell comprising:
   printing a component of the electrochemical cell with an additive fabrication apparatus, wherein the electrochemical cell includes:
      an anode separator plate having at least one channel for transport of media, the anode separator plate printed using an electrically conductive material;
      a membrane electrode assembly on the anode separator plate, the membrane electrode assembly in direct contact with the at least one channel of the anode separator plate;
      a non-electrically conductive material on the anode separator where the membrane electrode assembly does not extend, where the non-electrically conductive material forms a frame for the membrane electrode assembly; and
      a cathode separator plate having at least one channel on a side facing the membrane electrode assembly and at least one channel on a side opposite the membrane electrode assembly, wherein both channels are for transport of media, the cathode separator plate printed using the electrically conductive material,
   wherein the electrically conductive material is a carbon coated thermoplastic filament.

* * * * *